(12) United States Patent
Kuwahara et al.

(10) Patent No.: US 8,421,318 B2
(45) Date of Patent: Apr. 16, 2013

(54) ROTOR OF ROTATING ELECTRICAL MACHINE

(75) Inventors: Takeshi Kuwahara, Hitachinaka (JP);
Yukiyoshi Yanagisawa, Hitachi (JP);
Koshu Hagiya, Hitachi (JP); Masayuki Okada, Hitachi (JP); Yosuke Omori, Hitachi (JP); Shigeki Akanuma, Hitachi (JP)

(73) Assignee: Hitachi Mitsubishi Hydro Corporation, Tokyo (JP)

( * ) Notice: Subject to any disclaimer, the term of this patent is extended or adjusted under 35 U.S.C. 154(b) by 77 days.

(21) Appl. No.: 13/101,181

(22) Filed: May 5, 2011

(65) Prior Publication Data
US 2011/0278994 A1    Nov. 17, 2011

(30) Foreign Application Priority Data

May 13, 2010    (JP) .................................. 2010-110991

(51) Int. Cl.
*H02K 5/00*    (2006.01)
(52) U.S. Cl.
USPC ........................................................ 310/422
(58) Field of Classification Search .................. 310/422, 310/216.049, 216.051, 216.053, 216.087, 310/216.113
See application file for complete search history.

(56) References Cited

U.S. PATENT DOCUMENTS 2,263,220 A * 11/1941 Mejean .................. 310/216.011
4,110,652 A *  8/1978 McGahern ..................... 310/422
4,942,324 A *  7/1990 Ooyama et al. ........ 310/216.007

FOREIGN PATENT DOCUMENTS

JP    2008-061356    3/2008
JP    2010-004583    1/2010

* cited by examiner

*Primary Examiner* — Nguyen N Hanh
(74) *Attorney, Agent, or Firm* — Antonelli, Terry, Stout & Kraus, LLP.

(57) ABSTRACT

A rotating electrical machine is provided in which, even when torque from a water turbine is reduced and reverse torque is applied due to load cut off, a rotor core is not eccentric to spider arms. The rotor of a rotating machine includes a vertical rotating shaft, spider arms extending radially from the vertical rotating shaft, and a rotor core component provided to the outer circumference of the spider arms. A T key and cotters are inserted into and secured to a key way provided to an abutment surface of the inner circumference of the rotor core component and the top end of the spider arm. A plate spring is mounted to a surface of the spider arm, the surface facing a rotational direction for electrical generation. The plate spring has one side engaging the spider arm, the other side engaging the rotor core component, and a middle portion bolted from an opposite surface of the spider arm.

6 Claims, 6 Drawing Sheets

ROTATIONAL DIRECTION H
FOR ELECTRICAL GENERATION

ROTATIONAL DIRECTION H
FOR ELECTRICAL GENERATION

ROTOR OF ROTATING ELECTRICAL MACHINE

CLAIM OF PRIORITY

The present application claims priority from Japanese Patent application serial no. 2010-110991, filed on May 13, 2010, the content of which is hereby incorporated by reference into this application.

FIELD OF THE INVENTION

The present invention relates to a rotor of a rotating electrical machine arranged vertically like a water turbine generator and particularly to a rotor of a rotating electrical machine having a cylindrical rotor core component on the outer circumference of spider arms which extend radially from a vertical rotating shaft in the radial direction and using keys to join the spider arms and cylindrical rotor core component.

BACKGROUND OF THE INVENTION

A rotor of a rotating electrical machine having a cylindrical rotor core provided to the outer circumference of spider arms is well known, e.g., in JP-A No. 2008-61356 and JP-A No. 2010-4583.

FIG. 5 shows a structure of a rotor of a well known rotating electrical machine in JP-A No. 2008-61356 and JP-A No. 2010-4583. This figure shows an axial top view (lower) and its partial enlarged view (upper) of a vertical axis water turbine generator. A rotating shaft 2 is at the center of the top view. Multiple spider arms 6 extend radially from the rotating shaft 2 in the radial direction. A rotor core 7 is secured via the multiple spider arms 6.

The rotor core 7 of components forming the rotor of the rotating electrical machine of the vertical axis water turbine generator is a circular steel plate formed by arranging uniformly shaped fan shaped thin segment cores circumferentially, which are laminated axially while being offset circumferentially to structure the cylindrical rotor core. Key ways are provided to the inner circumference of the segment cores at the same pitch as the circumferentially offset pitch. Accordingly, as shown in the partial enlarged view of FIG. 5, multiple key ways 11a are formed to the inner circumference of the cylindrically structured rotor core 7 at aligned positions.

On the other hand, a key way 10 is formed also to the radial top end of each spider arm 6 extending radially from the vertical rotating shaft 2 in the radial direction. The key way 11a of the rotor core 7 is disposed correspondingly to the key way 10 of the radial top end of each spider arm 6.

The spider arms 6 and the rotor core 7 are joined by inserting a T key 14 into the key ways (10 and 11a) and then inserting cotters 15 into circumferential gaps between the T key 14 and key ways (10 and 11a). Accordingly, the rotor core 7 is secured to the spider arms 6.

Specifically, for example, the head of the T key 14 is positioned in the key way 10 of the spider arm and the foot of the T key 14 is positioned in the key way 11a of the rotor core. When the foot of T key 14 is merely inserted into key way 11a of the rotor core, the gaps are produced. Therefore, cotters 15a and 15b are inserted into the gaps on both sides of this foot.

According to this engagement structure, there is no gap between the T key 14 and key way 11a during the shutdown of the rotating electrical machine, but the rotor rotates when the rotating electrical machine operates to apply a stress to the rotor core 7 due to centrifugal force. Then, the rotor core 7 displaces to widen circumferentially and radially. Particularly, the circumferential expansion becomes large because the stress gathers around the periphery of the key way 11a. Then, circumferential gaps are produced between the T key and key way 11a.

During the electrical generation by the rotating electrical machine, torque from a water turbine (not shown) directly connected to the vertical rotating shaft 2 is applied to the head of the T key 14 of the top end of each spider arm 6 and is transmitted to the rotor core 7 via the cotters 15 from the foot of the T key 14. As a result, each spider arm 6 is pushed onto the key way 11a in the rotational direction for electrical generation, and a resultant force F of pushing forces f is applied as a restraining force of the rotor core 7 on the spider arms 6.

That is, as shown by an arrow H, when the rotational direction for electrical generation is right in FIG. 5, the spider arms 6 and rotor core 7 engage on the right side (the side of the cotter 15b) of the key way 11a to apply the pushing force. Then, a circumferential gap 19 is produced on the left side (side of the cotter 15a) between the T key 14 and key way 11a.

On the other hand, a force to make the rotor core 7 eccentric by rotation, eccentric load P, applied on the rotor core 7 due to its own unbalance. Sufficient balancing can make the eccentric load P of the rotor core 7 smaller than the restraining force F by the push of the T key 14. Therefore, even when the gap 19 is produced circumferentially between the T key 14 and key way 11a during the electrical generation, the rotor core 7 is not offset eccentrically to the spider arms 6.

A water turbine generator may perform a pumping operation. In this case, the rotational direction is reverse. The spider arms 6 and rotor core 7 engage on the right side (side of the cotter 15b) of the key way 11a to apply the pushing force because the rotor core 7 is a source of torque generation. That is, also in the water turbine, irrespective of the mode of operation generator, the pushing force is applied by the engagement on the right side.

By the way, when a load cut off and an emergency stop arise during electrical generation, a rotational speed rises temporarily to enter a dangerous situation. Thus, it is necessary to stop a water turbine by closing an inlet valve of the water turbine. In such a state, in an early over speed state, the gap 19 between the T key 14 and key way 11a becomes larger. After that, when the acceleration begins to decrease, the pushing force of the T key 14 by the torque from the water turbine decreases. Then, when the rotational speed reaches near the maximum to close the inlet valve of the water turbine, the reverse torque is applied on the T key 14 for deceleration in turn. The application direction of the pushing force f of the T key 14 is reversed.

That is, at the early stage of the load cut off, the spider arms 6 and rotor core 7 engage on the right side of the key way 11a to apply the pushing force and then to produce the gap 19 circumferentially on the left side of the key way 11a between the T key 14 and key way 11a. After that, the engagement occurs on the left side of the key way 11a. Further, this intermediate state is to be called a floating state, in which the active engagement is not achieved on either side.

FIG. 6 shows relationship of the forces applied on each component at the time of the load cut off. The rotational direction H is maintained for electrical generation, but the pushing force f onto the right side of the key way 11a is reduced due to the large deceleration force.

In this process, the eccentric load P of the rotor core 7 becomes larger than the restraining force F by the push of the T key 14. The rotor core 7 is offset in the range of the gap between the T key 14 and key way 11a to be eccentric to the spider arms 6. Accordingly, the center of gravity of the rotor core 7 is displaced relative to the center of gravity of the spider arms 6. Then, an axial runout of the rotating shaft increases by an amplification ratio or over at its rotational speed. This may cause damage of a machine.

It is desirable to provide a rotating electrical machine in which a rotor core is not eccentric to spider arms even when a torque from a water turbine is reduced and a reverse torque is applied due to, e.g., load cut off.

SUMMARY OF THE INVENTION

In the present invention, a rotor of a rotating electrical machine has a vertical rotating shaft, spider arms extending radially from the vertical rotating shaft, and a rotor core component provided to the outer circumference of the spider arms. A T key and cotters are inserted into and secured to a key way provided to the inner circumference of the rotor core component and to the abutment surface of the top end of the spider arm. A plate spring is mounted to a surface of the spider arm, the surface facing the rotational direction of the rotational electrical machine. The plate spring has one side engaging the spider arm, the other side engaging the rotor core component, and a middle portion fastened to the spider arm.

The rotor core component includes a rim having cylindrically laminated fan-shaped segment rims and a rotor core on the outer circumference of the rim. The key ways may be provided to the inner circumference of the rim.

The rotor core component includes a rim having cylindrically laminated ring rims and a rotor core on the outer circumference of the rim. The key ways may be provided to the inner circumference of the rim.

The rotor core component includes laminated fan-shaped segment cores. The key ways may be provided to the inner circumference of the segment cores.

In the present invention, a rotor of a rotating electrical machine includes a vertical rotating shaft, spider arms extending radially from the vertical rotating shaft, and a rotor core component provided to the outer circumference of the spider arms. A T key and cotters are inserted into and secured to a key way provided to the abutment surface of the inner circumference of the rotor core component and the top end of the spider arm. A plate spring is mounted to a surface of the spider arm, the surface being in the rotational direction of the rotational electrical machine. The plate spring has one side engaging the spider arm, the other side engaging the rotor core component, and a middle portion bolted from the opposite side of the spider arm.

Multiple plate springs may be mounted to the spider arm axially.

According to the present invention, a rotating electrical machine is structured as follows. A pushing force of a T key applied by a plate spring is constantly applied as a restraining force of a rotor core. Even when load cut off occurs during electrical generation in the state in which circumferential gaps are produced between the T key and a key way, the rotor core is not eccentric to spider arms.

DETAILED DESCRIPTION OF THE EMBODIMENT

A rotor of a water turbine generator is explained below in FIGS. 1 to 8 as a rotor of a rotating electrical machine according to one embodiment of the present invention.
[Embodiments]

Figure 2:
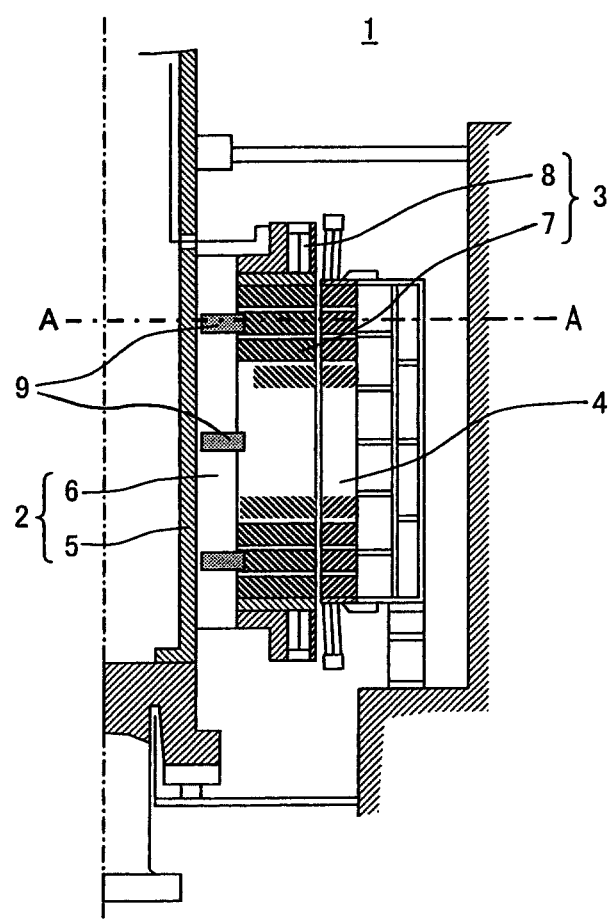
FIG. 2 shows a vertical cross section of the water turbine generator.

FIG. 2 shows a vertical cross section of a water turbine generator of one embodiment of the present invention. As shown in this figure, a water turbine generator 1 includes a rotor 3 secured to a rotating shaft 2 and a stator 4 mounted via a radial gap relative to the rotor 3. A water turbine not shown is coupled to the lower portion of the rotating shaft 2. The rotating shaft 2 includes a vertical rotating shaft 5 and spider arms 6 extending radially. The rotor 3 includes a rotor core 7 and a rotor winding 8.

Figure 1:
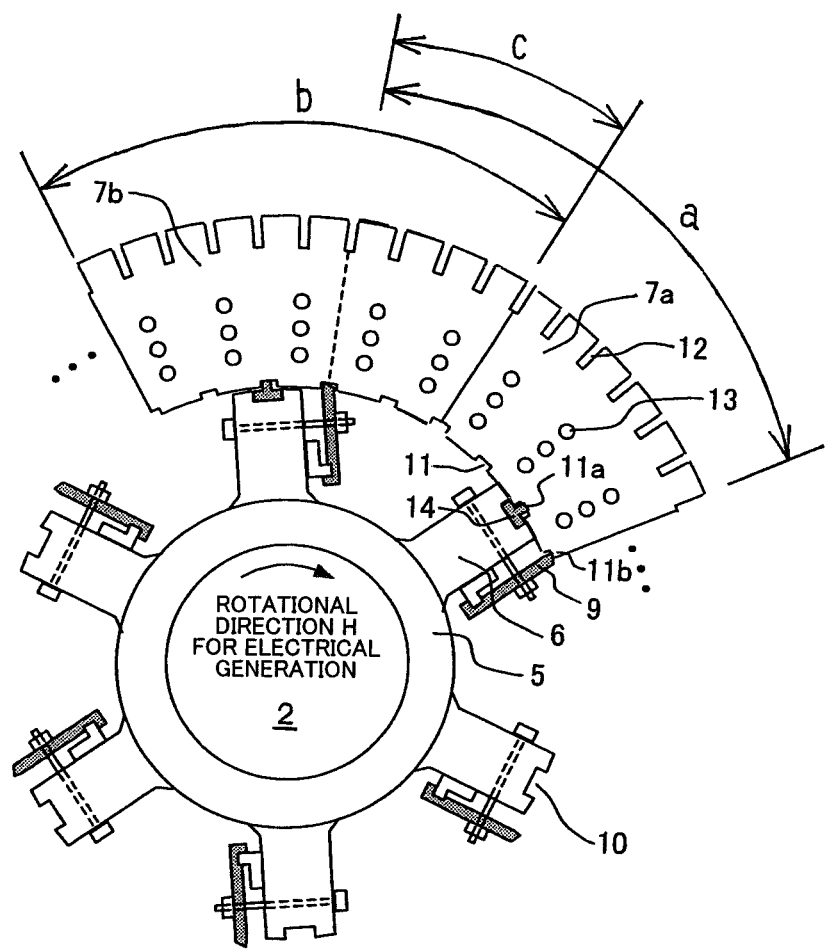
FIG. 1 shows a transverse cross section of a water turbine generator along section A-A of FIG. 2.

FIG. 1 shows a transverse cross section of the water turbine generator along section A-A of FIG. 2. As shown in this figure, the rotor core 7 has multiple fan-shaped thin plate segment cores 7a and 7b arranged circumferentially to have a circular shape and laminated axially while being offset circumferentially to have a cylindrical shape. In FIG. 1, the segment core 7b in a range b is mounted above the segment core 7a in a range a, and overlaps with the segment core 7a in a range c. In this way, the segment cores are laminated while being offset by the range c.

Key ways 11 for joining to the spider arms 6 are provided to the inner circumference of the segment cores 7a and 7b at the same pitch as an offset pitch or at a uniform pitch. The multiple key ways 11 are formed to the inner circumference of the rotor core 7 structured in a cylindrical shape at axially aligned positions. The segment cores 7a and 7b include slots 12 on the outer circumference thereof to insert the rotor windings 8 and bolt holes 13 to fasten the laminated segment cores. A preventive plate 9 for eccentricity of rotor, the plate of which is a plate spring for preventing eccentricity of the rotor core 7, is provided to a side of each spider arm 6, the side of which faces a rotational direction for electrical generation, and explained below in detail.

On the other hand, the radial top end of each spider arm 6 on the rotating shaft side has a key way 10 to join to the rotor core 7. A T key 14 is inserted between the key way 10 of the spider arm 6 and a corresponding key way 11a of the rotor core.

Figure 3:
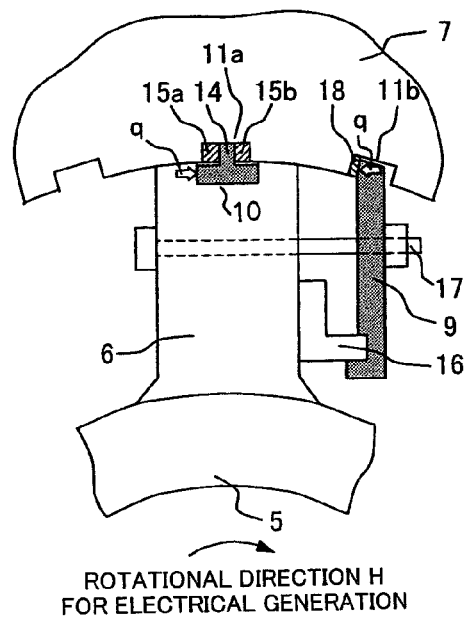
FIG. 3 shows a joint portion of a spider arm and a rotor core and an attachment structure of a preventive plate for eccentricity of rotor.

As shown by the enlarged joint portion in FIG. 3, cotters 15a and 15b are inserted into circumferential gaps between the T key 14 and key way 11a to secure the rotor core 7 to each spider arm 6. Specifically, the head of the T key 14 is positioned in the key way 10 of the spider arm 6, and the foot of the T key is positioned in the key way 11a of the rotor core 7. When the foot of the T key is merely inserted into the key way 11*a* of the rotor core 7, gaps are produced on both sides of the foot. Therefore, cotters 15*a* and 15*b* are inserted into these gaps.

Fundamentally, in the rotor of the rotating electrical machine structured as mentioned above, the preventive plates 9 for eccentricity of rotor are attached to the spider arms 6 in the present invention. The preventive plates 9 for eccentricity of rotor are attached to all the spider arms 6 as shown in FIG. 1, and may be attached to several vertical positions thereof as shown in FIG. 2. The preventive plates 9 are attached toward the rotational direction for electrical generation. In FIG. 1, since the rotational direction for electrical generation is right, the preventive plate 9 for eccentricity of rotor is attached to the right side surface of the spider arm 6.

As shown in FIG. 3, the preventive plate 9 for eccentricity of rotor is attached to the spider arm 6 to sandwich a key way 11*b* of the rotor core 7. The inner circumferential side of the preventive plate 9 for eccentricity of rotor is a support point against a preventive plate stopper 16 tightly secured to the spider arm 6. The outer circumferential top end of the preventive plate 9 for eccentricity of rotor is an action point against the key wall 11*b* of the rotor core 7 via a receiving fitting 18. A bolt 17 for bolting the preventive plate for eccentricity of rotor is provided between the support point and action point of the preventive plate 9 for eccentricity of rotor to bolt and bend the preventive plate 9. Then, a pushing force q is applied between the spider arm 6 and rotor core 7 via the T key 14 and cotter 15*b*.

The pushing force q is applied as a force of pushing the rotor core 7 leftward at the action point, which is the receiving fitting 18 of the key way 11*b* of the rotor core 7, and as a force of pushing the T key 14 rightward at the top end of the spider arm 6. That is, the pushing force is constantly applied to the right side of the key way 11*a* of the rotor core 7. This means that the pushing force is constantly applied to the side of the rotor core key way 11*a* toward the rotational direction for electrical generation.

A magnitude of the pushing force q per one preventive plate 9 for eccentricity of rotor is over a force converted by dividing a reverse torque generated from a water turbine at load cut off by a product of an action radius, the number of the spider arms 6, and the number of the preventive plates 9 for eccentricity of rotor per one spider arm 6. That is, even at load cut off, the pushing force is applied on the right side of the key way 11*a* of the rotor core 7. The pushing force q sufficient not to generate a gap on the right side is necessary. A resultant force of the pushing forces q, namely, a restraining force Q of the rotor core, is over an eccentric load P of the rotor core 7.

Roles of the preventive plates 9 for eccentricity of rotor are explained below in various operational statuses of the water turbine generator. First, as explained above using FIG. 5 and FIG. 6, when there is no preventive plate 9 for eccentricity of rotor, the rotor core is eccentric to the spider arms 6 as shown by the dashed line of FIG. 6.

Figure 4:
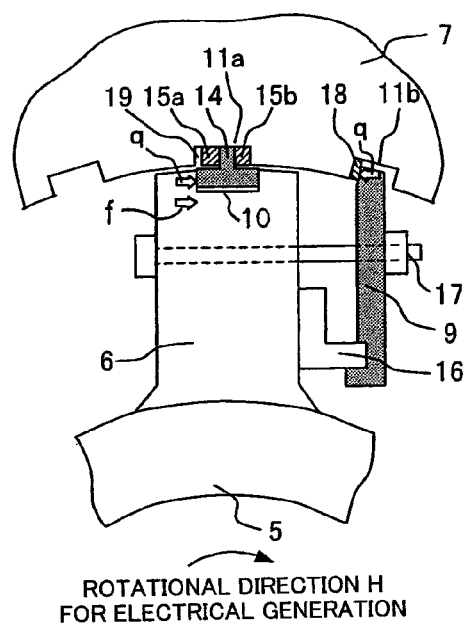
FIG. 4 shows a relationship of forces applied during electrical generation of a water turbine generator 1.
Figure 5:
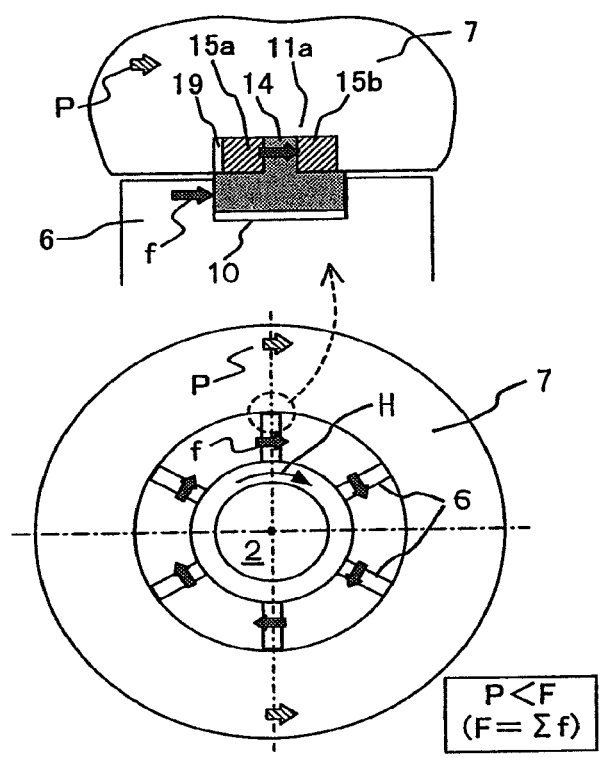
FIG. 5 shows a structure of a rotor of a well known rotating electrical machine.
Figure 6:
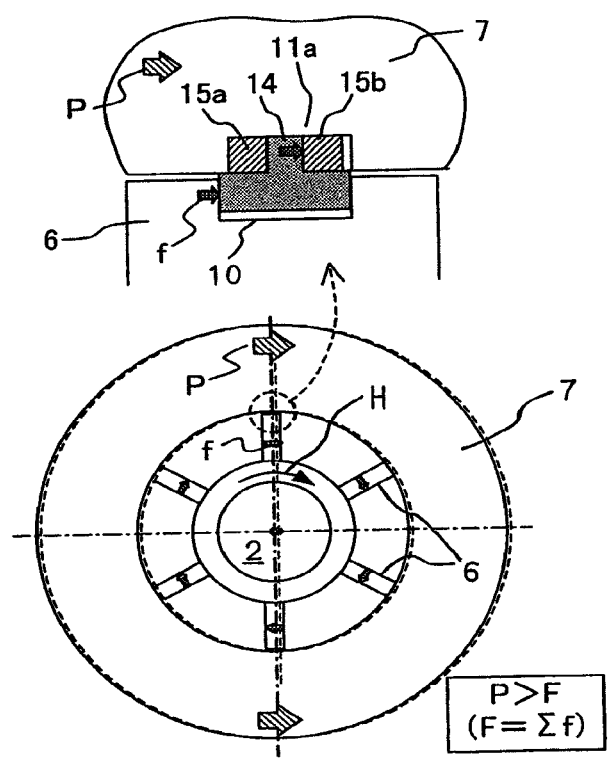
FIG. 6 shows a relationship of forces applied on each component at the time of load cut off.

On the other hand, according to this embodiment, when the water turbine generator 1 shown in FIG. 4 operates to generate electricity, the key way 11*a* widens due to electricity generating operation, and a circumferential gap 19 is produced between the T key 14 and key way 11*a*, a pushing force f applied on the right side, and the pushing force q of the preventive plate 9 for eccentricity of rotor is applied on the key way 11*a* toward the rotational direction for electrical generation via the T key 14 and cotter 15*b*. As a result, the contact is maintained. Therefore, the pushing force is strengthened more than before.

When torque from the water turbine is reduced and reverse torque is applied due to load cut off etc., the pushing force f on the right side is reduced due to the deceleration, but the contact is maintained by the pushing force q of the preventive plate 9 for eccentricity of rotor, and the rotor core 7 is not eccentric to the spider arms 6.

The preventive plate 9 for eccentricity of rotor has a plate spring structure because the adjustment of the pushing force q is easy and because excess bending stress is not applied to the preventive plate 9 for eccentricity of rotor even when a gap between the key ways 11*a* and 11*b* widens circumferentially due to a centrifugal force in operation.

Even when the action point at the top end of the preventive plate 9 for eccentricity of rotor and the contact surface of the T key 14 and cotter 15*b* are worn due to sliding at shutdown, reduction of the pushing force can be eased. When the pushing force is reduced due to aging, the pushing force can be recovered by bolting again.

The receiving fitting 18 is provided to prevent serious wear and damage of the contact surface of the top end of the preventive plate 9 for eccentricity of rotor and the key way 11*b* due to, e.g., sliding. The receiving fitting 18 has a hooking structure not to drop out of the key way 11*b*, as not shown. Wear-resistant processing is applied to the contact surface of the preventive plate 9 for eccentricity of rotor and the receiving fitting 18 to reduce the frictional coefficient.

Since the restraining force of the rotor core is constantly applied, the center of gravity of the rotor core is stably positioned even in no-load operation. Accordingly, the unbalance is adjusted relatively easily.

In pumping operation, the rotational direction is reverse to transmit torque from the rotor core to the spider arms, but the transmission surface for torque between the T key and key way, the contact surface, is the same as in the electrical generation. Therefore, the pushing force is maintained in the pumping operation.

Figure 7:
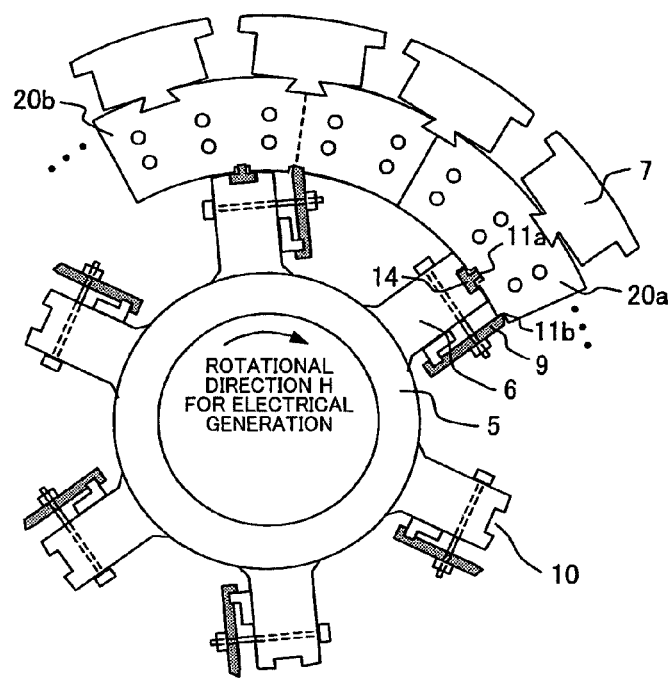
FIG. 7 shows an arrangement of a preventive plate for eccentricity of rotor of the rotor when using segment rims.
Figure 8:
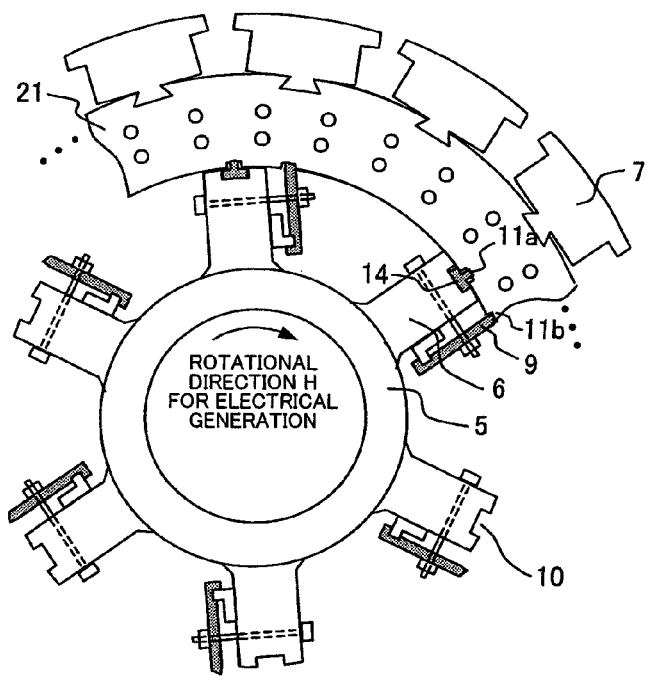
FIG. 8 shows an arrangement of a preventive plate for eccentricity of rotor of the rotor when using ring rims.

The water turbine generator 1 including the rotor core 7 having the laminated segment cores 7*a*, 7*b* on the outer circumference of the spider arms 6 has been explained above as one example of the rotational electrical machine. The present invention is applicable to a rotational electrical machine structured to have segment rims 20*a*, 20*b* cylindrically laminated on the outer circumference of the spider arms as shown in FIG. 7 and to a rotational electrical machine structured to have ring rims 21 cylindrically laminated as shown in FIG. 8. In this case, in addition to the key way 11*a* for joining to the spider arm, a key way 11*b* for the preventive plate for eccentricity of rotor may be provided to the inner circumference of the rim.

In short, the present invention has the structure for attaching the rotor core component to the outer circumference of the spider arms 6. The component may be the rotor core 7 having the laminated segment cores 7*a*, 7*b* or the rotor core 7 having the laminated segment rims 20*a*, 20*b* or the segment cores 7*a*, 7*b* laminated via the ring rims. In addition to the key way 11*a* for joining to the spider arm, the key way 11*b* for the preventive plate for eccentricity of rotor may be provided to the rotor core component.

The present invention is applicable to prevent eccentricity of a vertical axis water turbine generator by use of a simple structure.

What is claimed is:

1. A rotor of a rotating electrical machine, the rotor comprising:
   a vertical rotating shaft;
   spider arms extending radially from the vertical rotating shaft; and
   a rotor core component provided to an outer circumference of the spider arms, a T key and cotters being inserted into and secured to a key way provided to an abutment surface of an inner circumference of the rotor core component and a top end of the spider arm, a plate spring having one side engaging the spider arm, the other side engaging the rotor core component, and a middle portion fastened to the spider arm, and the plate spring being mounted to a surface of the spider arm, the surface facing a rotational direction for electrical generation.

2. The rotor according to claim 1,
wherein the rotor core component includes a rim having cylindrically laminated fan-shaped segment rims and a rotor core on an outer circumference of the rim, and the key way is provided to an inner circumference of the rim.

3. The rotor according to claim 1,
wherein the rotor core component includes a rim having cylindrically laminated ring rims and a rotor core on an outer circumference of the rim, and the key way is provided to an inner circumference of the rim.

4. The rotor according to claim 1,
wherein the rotor core component has laminated fan-shaped segment cores, and the key way is provided to an inner circumference of the component.

5. A rotor of a rotating electrical machine, the rotor comprising:
    a vertical rotating shaft;
    spider arms extending radially from the vertical rotating shaft; and
    a rotor core component provided to an outer circumference of the spider arms,
    a T key and cotters being inserted into and secured to a key way provided to an abutment surface of an inner circumference of the rotor core component and a top end of the spider arm,
    a plate spring having one side engaging the spider arm, the other side engaging the rotor core component, and a middle portion bolted from an opposite surface of the spider arm, and
    the plate spring being mounted to a surface of the spider arm, the surface facing a rotational direction for electrical generation.

6. The rotor according to any one of claims 1 to 5,
wherein a plurality of plate springs are mounted to the spider arm axially.

* * * * *